US011252609B2

(12) United States Patent
Igawa

(10) Patent No.: US 11,252,609 B2
(45) Date of Patent: Feb. 15, 2022

(54) WIRELESS LAN SYSTEM, COMMUNICATION SPEED UPPER LIMIT SETTING METHOD, AND NON-TRANSITORY COMPUTER-READABLE MEDIUM HAVING COMMUNICATION SPEED UPPER LIMIT SETTING PROGRAM STORED THEREON

(71) Applicant: NEC Platforms, Ltd., Kawasaki (JP)

(72) Inventor: Masaya Igawa, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 4 days.

(21) Appl. No.: 16/765,197

(22) PCT Filed: Jul. 23, 2018

(86) PCT No.: PCT/JP2018/027479
§ 371 (c)(1),
(2) Date: May 19, 2020

(87) PCT Pub. No.: WO2019/102647
PCT Pub. Date: May 31, 2019

(65) Prior Publication Data
US 2020/0280884 A1 Sep. 3, 2020

(30) Foreign Application Priority Data
Nov. 27, 2017 (JP) .............................. JP2017-227011

(51) Int. Cl.
*H04W 28/10* (2009.01)
*H04L 12/815* (2013.01)
(Continued)

(52) U.S. Cl.
CPC .............. *H04W 28/10* (2013.01); *H04L 47/22* (2013.01); *H04W 28/0257* (2013.01); *H04W 28/22* (2013.01); *H04W 84/12* (2013.01)

(58) Field of Classification Search
CPC ..... H04W 88/08; H04W 28/02; H04W 47/22; H04W 28/0257; H04W 28/22; H04W 28/10; H04W 84/12; H04L 12/815
(Continued)

(56) References Cited

U.S. PATENT DOCUMENTS 6,963,551 B2 * 11/2005 Uebayashi ............ H04W 28/18
370/335
7,480,277 B2 * 1/2009 Uebayashi ............ H04W 28/18
370/335
(Continued)

FOREIGN PATENT DOCUMENTS

JP 2004-221710 A 8/2004
JP 2005-260384 A 9/2005
(Continued)

OTHER PUBLICATIONS

International Search Report for PCT Application No. PCT/JP2018/027479, dated Aug. 28, 2018.
(Continued)

*Primary Examiner* — Man U Phan

(57) ABSTRACT

A wireless LAN access point is configured to perform a shaping operation to calculate and set an upper limit of communication speeds of belonging mobile units when the number of the belonging mobile units is equal to or more than a preset threshold. The wireless LAN access point is configured to extract a highest one or a lowest one of data transfer rates that are detected by analyzing header parts of communication packets to be exchanged respectively with the belonging mobile units as a shaping data-transfer rate. The wireless LAN access point is configured to calculate the upper limit of the communication speeds of the belonging mobile units on the basis of a correction factor that is arbitrarily set for converting the shaping data-transfer rate to an effective data-transfer rate, on the basis of the shaping data-transfer rate, and on the basis of the number of the belonging mobile units.

4 Claims, 7 Drawing Sheets

(51) Int. Cl.
   *H04W 28/02*   (2009.01)
   *H04W 28/22*   (2009.01)
   *H04W 84/12*   (2009.01)

(58) Field of Classification Search
   USPC .......................................................... 370/329
   See application file for complete search history.

(56) References Cited

U.S. PATENT DOCUMENTS

| | | | |
|---|---|---|---|
| 7,944,893 B2 * | 5/2011 | Uebayashi | H04W 28/22 |
| | | | 370/335 |
| 9,462,621 B2 * | 10/2016 | Kuriyama | H04W 76/12 |
| 9,853,899 B2 * | 12/2017 | Ringland | H04W 72/10 |
| 10,154,532 B2 * | 12/2018 | Yamazaki | H04W 88/06 |
| 10,645,737 B2 * | 5/2020 | Shibuya | H04W 76/10 |
| 10,721,788 B2 * | 7/2020 | Ogawa | H04W 76/36 |
| 2006/0146709 A1 * | 7/2006 | Ginzburg | H04W 28/16 |
| | | | 370/232 |
| 2011/0013579 A1 | 1/2011 | Kuriyama | |
| 2016/0043953 A1 | 2/2016 | Ringland et al. | |
| 2020/0413327 A1 * | 12/2020 | Inoki | H04W 48/20 |

FOREIGN PATENT DOCUMENTS

| | | |
|---|---|---|
| JP | 2010-114562 A | 5/2010 |
| JP | 2018-117275 A | 7/2018 |
| WO | 2009/113414 A1 | 9/2009 |

OTHER PUBLICATIONS

Japanese Office Action for JP Application No. 2019-556095 dated Jun. 29, 2021 with English Translation.

\* cited by examiner

WIRELESS LAN SYSTEM, COMMUNICATION SPEED UPPER LIMIT SETTING METHOD, AND NON-TRANSITORY COMPUTER-READABLE MEDIUM HAVING COMMUNICATION SPEED UPPER LIMIT SETTING PROGRAM STORED THEREON

This application is a National Stage Entry of PCT/JP2018/027479 filed on Jul. 23, 2018, which claims priority from Japanese Patent Application 2017-227011 filed on Nov. 27, 2017, the contents of all of which are incorporated herein by reference, in their entirety.

TECHNICAL FIELD

The present invention relates to a wireless LAN system, a communication speed upper limit setting method, and a communication speed upper limit setting program. In particular, the present invention relates to a wireless LAN system, a communication speed upper limit setting method, and a communication speed upper limit setting program that are suited to wireless LAN systems for corporations and to an ICT (Information and Communication Technology) for schools/education, where a large number of mobile units (terminals) are operated.

BACKGROUND ART

In recent years, the wireless LAN system has already prevailed as an information infrastructure regardless of corporations or individuals. In particular, by prevalence of mobile terminals, a use case where ten or more terminals are caused to wirelessly belong to a single wireless LAN access point so as to communicate with each other has become not uncommon. More particularly, as for many of the wireless LAN access points for corporations, there are many cases where a large number of mobile units (terminals) are caused to wirelessly belong thereto. Specifically, in recent years, establishment of the ICT environment at schools has been rapidly promoted. There are actual cases where a class utilizing the wireless LAN system is held and more than forty tablet terminals (mobile units) are wirelessly connected to a single wireless LAN access point (a base unit). Specifically, there is a case where a moving image is distributed at once from a teacher's PC (Personal Computer) to students' tablet terminals with use of educational software.

In such a case, when speeds of communication from the wireless LAN access point to the students' tablet terminals vary from each other, such a phenomenon that the moving image cannot be reproduced by a certain one of the students' tablet terminals has occurred, which hinders the progress of the class. Along with rapid development of the establishment of the ICT environment in corporations or at schools, importance of the communication from the wireless LAN access point to the large number of terminals (the mobile units) has been increasing more and more. Functions to enable equitable communication with the large number of terminals (the mobile units), and to equalize the respective speeds of communication with the terminals (the mobile units) to each other have been strongly demanded.

In view of such circumstances, in the "VIDEO CONFERENCE SYSTEM" according to Japanese Unexamined Patent Application Publication No. 2005-260384 as Patent Literature 1, a technology to define and set, in advance on the system side, a fixed upper limit of the respective communication speeds of the terminals (the mobile units) in accordance with the connection number of the terminals to be wirelessly connected as the mobile units to the wireless LAN access point has been proposed.

CITATION LIST

Patent Literature

Japanese Unexamined Patent Application Publication No. 2005-260384

SUMMARY OF INVENTION

Technical Problem

However, even when the technology as disclosed in Patent Literature 1 is employed, problems as follows with the current wireless LAN systems have remained unsolved.

When the plurality of mobile units belong to the single wireless LAN access point (hereinafter, sometimes abbreviated as an 'AP') as the base unit, and each of the mobile units communicates at once, the mobile units scramble for a limited bandwidth. As a result, the communication speeds vary from mobile unit to mobile unit. Specifically, a phenomenon that a certain one of the mobile units can satisfactorily communicate, and meanwhile another certain one of the mobile units cannot communicate by failing to secure a communication bandwidth, or cannot communicate at a satisfactory communication speed even if can communicate has occurred. In particular, this tendency is conspicuous in a case where a large number of mobile units present in a certain specific wireless-communication space are caused to belong to the single AP for corporations, schools, or the like.

In addition, as in the technology disclosed in Patent Literature 1, in order to provide the function to limit the speeds of the communication with the mobile units by presetting the communication-speed upper limit on the AP side, the communication-speed upper limit for each of the mobile units needs to be fixedly set in advance on the AP side. Even in such cases, there are no problems as long as the communication-speed upper limit is set in advance in anticipation of the connection to the large number of mobile units, and the anticipated number of mobile units are actually connected.

However, there is a problem that, when the number of the mobile units belonging to the AP sharply decreases, for example, to one afterward, limitation based on the communication-speed upper limit set for the large number of mobile units is imposed on the only one mobile unit, with the result that the mobile unit cannot communicate at a satisfactorily sufficient speed. In other words, the communication-speed upper limit, which is normally set fixedly in advance in anticipation of the connection to the large number, specifically, several tens of mobile units, is a value set on a premise that the several tens of mobile units share the communication bandwidth of the AP. Thus, the communication speed becomes much lower than that in a case where the AP communicates with the only one mobile unit.

As described above, although the current technologies are advantageous to specific cases, setting of the communication-speed upper limit cannot be varied in accordance with variations in environment and in the number of the mobile units. Thus, there are not a few problems for practical use.

(Object of Present Invention)

The present invention has been made in view of the circumstances as described above, and an object of the present invention is to provide a wireless LAN system, a communication speed upper limit setting method, and a communication speed upper limit setting program that enable each mobile unit belonging to a wireless LAN system as a base unit in the wireless LAN system to equitably communicate by setting an appropriate communication-speed upper limit for each of the mobile units in accordance with environments.

Solution to Problem

In order to solve the problems as described above, the wireless LAN system, the communication speed upper limit setting method, and the communication speed upper limit setting program according to the present invention mainly employ the characteristic configurations as follows.

(1) The wireless LAN system according to the present invention includes a wireless LAN access point as a base unit and mobile units. The wireless LAN system is characterized in that the wireless LAN access point is configured to check the number of belonging mobile units, the mobile units being those present in a wireless communication area of the wireless LAN access point and belonging to the wireless LAN access point, the wireless LAN access point is configured to perform a shaping operation to calculate and set an upper limit of communication speeds of the belonging mobile units as a common communication-speed upper limit for each of the belonging mobile units when the number of the belonging mobile units is equal to or more than a preset first threshold, and meanwhile the wireless LAN access point is configured not to perform the shaping operation when the number of the belonging mobile units is less than the preset first threshold.

(2) In addition, according to the present invention, there is provided another wireless LAN system including a wireless LAN access point as a base unit and mobile units. The other wireless LAN system is characterized in that the wireless LAN access point is configured to check the number of belonging mobile units and the number of communicating mobile units, the belonging mobile units being those present in a wireless communication area of the wireless LAN access point and belonging to the wireless LAN access point, the communicating mobile units being those communicating with the wireless LAN access point among the belonging mobile units, the wireless LAN access point is configured to perform a shaping operation to calculate and set an upper limit of communication speeds of the communicating mobile units as a common communication-speed upper limit for each of the communicating mobile units when the number of the belonging mobile units is equal to or more than a preset first threshold and the number of the communicating mobile units is equal to or more than a preset second threshold, and meanwhile the wireless LAN access point is configured not to perform the shaping operation when the number of the belonging mobile units is less than the preset first threshold, or when the number of the communicating mobile units is less than the preset second threshold.

(3) The communication speed upper limit setting method according to the present invention is provided for setting an upper limit of communication speeds of data to be exchanged between a wireless LAN access point as a base unit and mobile units in a wireless LAN system. The communication speed upper limit setting method is characterized by including:

checking, by the wireless LAN access point, the number of belonging mobile units, the mobile units being those present in a wireless communication area of the wireless LAN access point and belonging to the wireless LAN access point; and performing, by the wireless LAN access point, a shaping step of calculating and setting an upper limit of communication speeds of the belonging mobile units as a common communication-speed upper limit for each of the belonging mobile units when the number of the belonging mobile units is equal to or more than a preset first threshold, or characterized by including:

checking, by the wireless LAN access point, the number of the belonging mobile units, and the number of communicating mobile units as ones of the belonging mobile units, the ones of the belonging mobile units being communicating with the wireless LAN access point; and performing, by the wireless LAN access point, the shaping step of calculating and setting an upper limit of communication speeds of the communicating mobile units as a common communication-speed upper limit for each of the communicating mobile units when the number of the belonging mobile units is equal to or more than the preset first threshold, and at the same time when the number of the communicating mobile units is equal to or more than a preset second threshold.

(4) The communication speed upper limit setting program according to the present invention is provided for causing a computer to execute a procedure for setting an upper limit of communication speeds of data to be exchanged between a wireless LAN access point as a base unit and mobile units in a wireless LAN system. The communication speed upper limit setting program is characterized by including:

causing the wireless LAN access point to check the number of belonging mobile units, the mobile units being those present in a wireless communication area of the wireless LAN access point and belonging to the wireless LAN access point; and causing the wireless LAN access point to execute a shaping process for calculating and setting an upper limit of communication speeds of the belonging mobile units as a common communication-speed upper limit for each of the belonging mobile units when the number of the belonging mobile units is equal to or more than a preset first threshold, or characterized by including:

causing the wireless LAN access point to check the number of the belonging mobile units, and the number of communicating mobile units as ones of the belonging mobile units, the ones of the belonging mobile units being communicating with the wireless LAN access point; and causing the wireless LAN access point to execute the shaping process for calculating and setting an upper limit of communication speeds of the communicating mobile units as a common communication-speed upper limit for each of the communicating mobile units when the number of the belonging mobile units is equal to or more than the preset first threshold, and at the same time when the number of the communicating mobile units is equal to or more than a preset second threshold.

Advantageous Effects of Invention

According to the wireless LAN systems, the communication speed upper limit setting method, and the communication speed upper limit setting program of the present invention, advantages as follows can be obtained.

First, the wireless LAN access point uniformly allocates the common communication-speed upper limit (a shaping upper limit) to each of the plurality of belonging mobile units or of the plurality of communicating mobile units. By doing so, equitable communication can be provided to each of the plurality of belonging mobile units or of the plurality of communicating mobile units.

Second, when the number of the belonging mobile units is less than the preset first threshold, or when the number of the communicating mobile units is less than the preset second threshold, even without imposing limitation to set the common communication-speed upper limit, each of the mobile units is allowed to communicate at a satisfactory communication speed. Thus, the shaping operation to allocate the common communication-speed upper limit (the shaping upper limit) to each of the mobile units is not performed. Meanwhile, when the number of the belonging mobile units is equal to or more than the preset first threshold, and when the number of the communicating mobile units is equal to or more than the preset second threshold, in order that each of the mobile units can equitably communicate, the shaping operation to allocate the common communication-speed upper limit to each of the mobile units is performed. By doing so, the shaping operation need not be unnecessarily performed, and hence application of unnecessary load to the wireless LAN access point can be reduced.

Third, a determination as to whether the shaping operation to allocate the communication-speed upper limit to each of the mobile units needs to be performed can be automatically made, and the shaping operation can be automatically performed without manpower intervention. Thus, a burden on an administrator of the wireless LAN access point can be reduced, and hence practical use is facilitated.

DESCRIPTION OF EMBODIMENTS

Figure 1:
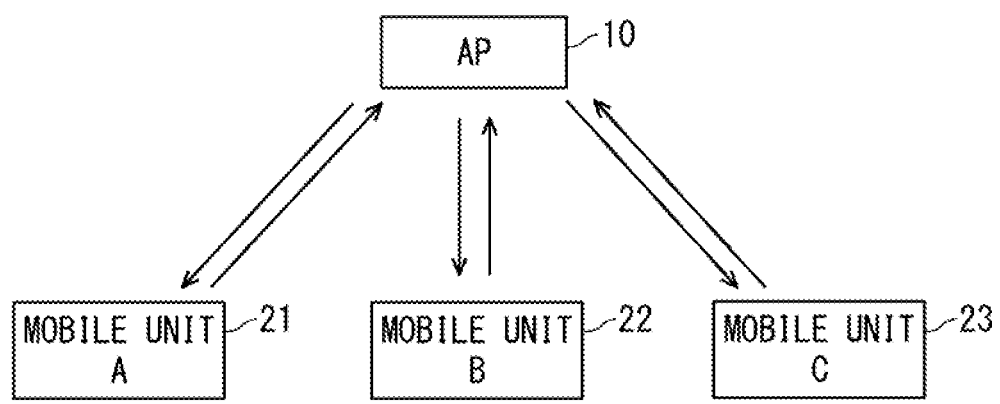
FIG. 1 is a schematic diagram showing a basic configuration example of an example embodiment of a wireless LAN system according to the present invention.

Preferred example embodiments of a wireless LAN system, a communication speed upper limit setting method, and a communication speed upper limit setting program according to the present invention are described hereinafter with reference to the accompanying drawings. Note that, as a matter of course, with regard to the following description of the wireless LAN system and the communication speed upper limit setting method according to the present invention, the communication speed upper limit setting method may be implemented as the communication speed upper limit setting program that can be executed by a computer. Alternatively, as a matter of course, the communication speed upper limit setting program may recorded on a computer-readable recording medium. In addition, each reference symbol used in each of the drawings hereinafter is added as an example for the sake of convenience to components for ease of understanding, which is not intended to limit the present invention to configurations shown in the drawings as a matter of course.

(Feature of Present Invention)

Before the description of the example embodiment of the present invention is given, a summary of the feature of the present invention is described. The main feature of the present invention resides in setting a common communication-speed upper limit for each of a plurality of mobile units such that, in the wireless LAN system, an upper limit of respective speeds of communication between a base unit as a wireless LAN access point and the plurality of mobile units is automatically set in accordance with environments, whereby each of the plurality of mobile units can equitably communicate.

More specifically, the main feature of the present invention resides in allowing the wireless LAN access point (hereinafter, sometimes abbreviated as the 'AP') to perform a shaping operation including monitoring the number of mobile units currently belonging to the AP itself, automatically setting the upper limit of the respective speeds of the communication with the mobile units in accordance with the number of the mobile units, and resides in automatically calculating and setting an appropriate upper limit of the communication speeds in accordance with the number of the currently-belonging mobile units and with respective communication speeds of data that is currently exchanged between the base unit as the AP and the mobile units in performing the shaping operation.

By dynamically setting the appropriate communication-speed upper limit in accordance with the number of currently-belonging mobile units and the current communication speed as described above, it is possible to prevent a phenomenon that the communication speed decreases due to occupation of a bandwidth of the communication with the AP by a certain one of the mobile units (terminals), the occupation hindering other the mobile units from securing the communication bandwidth. This enables the AP to equitably secure the communication with a large number of mobile units, and to automatically follow variations in the number of the mobile units and in communication speed. By doing so, the problems as described above with the current technologies for allocating the wireless communication bandwidth can be solved.

Example Embodiments of Present Invention

Next, the example embodiment of the wireless LAN system according to the present invention is described with reference to FIG. 1. FIG. 1 is a schematic diagram showing a basic configuration example of the example embodiment of the wireless LAN system according to the present invention. In the example embodiment of the present invention, a case where three mobile units, specifically, a mobile unit A 21, a mobile unit B 22, and a mobile unit C 23 belong to a single AP 10 (a wireless LAN access point) as a base unit as shown in FIG. 1 is described as the basic configuration example of the wireless LAN system. However, in the present invention, the number of the belonging mobile units is not limited to three, and an arbitrary number of mobile units may belong to the AP 10.

In this example embodiment, in the basic configuration example of the wireless LAN system exemplified in FIG. 1, an upper limit of respective speeds of communication between the AP 10 and the mobile unit A 21, the mobile unit B 22, and the mobile unit C 23 is automatically set to a common value, whereby the respective communication speeds of the mobile unit A 21, the mobile unit B 22, and the mobile unit C 23 are made equal to each other. Note that the AP 10 and each of the mobile unit A 21, the mobile unit B 22, and the mobile unit C 23 communicate with each other via a wireless LAN according to the IEEE 802.11 standard (the IEEE 802.11ac/n/g/b/a standard). In addition, a frequency band to be used may be either one of 5 GHz and 2.4 GHz.

Note that, in this example embodiment, the AP 10 has a function to automatically distinguish the number of mobile units that are present in a wireless communication area of the AP 10 itself and that belong to the AP 10 itself (or, belonging mobile units), a function to automatically distinguish respective communication speeds of the belonging terminals, and a function to automatically calculate the communication-speed upper limit common to each of the mobile units on the basis of the distinguished number of the belonging mobile units and of the distinguished respective communication speeds of the mobile units.

Configuration Example of Example Embodiment

Figure 2:
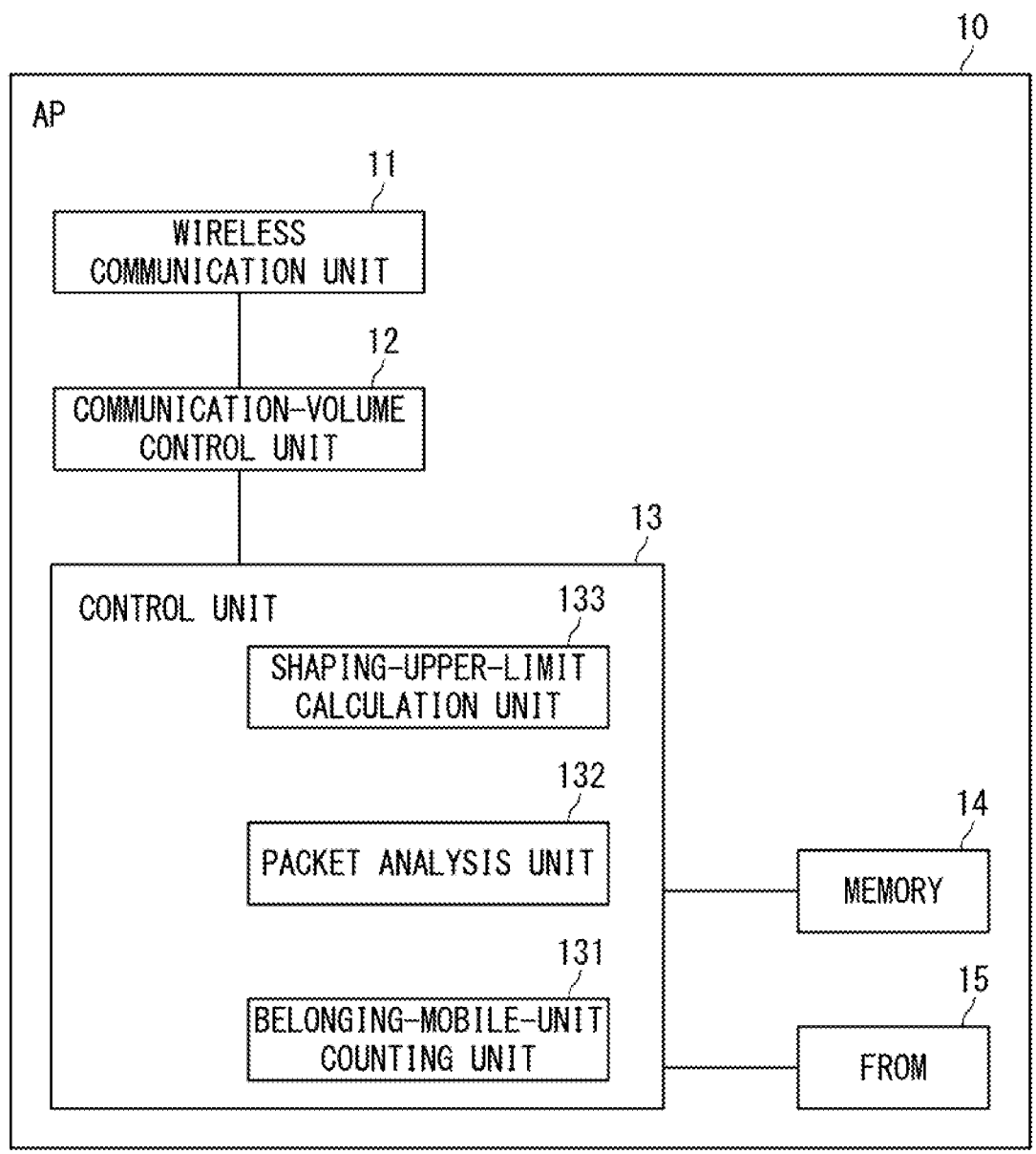
FIG. 2 is a configuration block diagram showing an example of an internal configuration of an AP (a wireless LAN access point) shown in FIG. 1.

Next, an internal configuration of the AP 10 (the wireless LAN access point) shown in FIG. 1 is described in detail with reference to FIG. 2. FIG. 2 is a configuration block diagram showing an example of the internal configuration of the AP 10 shown in FIG. 1. The AP 10 shown in FIG. 2 includes at least a wireless communication unit 11, a communication-volume control unit 12, a control unit 13, a memory 14, and an FROM 15. The control unit 13 includes therein at least a belonging-mobile-unit counting unit 131, a packet analysis unit 132, and a shaping-upper-limit calculation unit 133.

The wireless communication unit 11 has a function to perform the wireless LAN communication according to the IEEE 802.11 standard with the mobile units (the terminals) belonging to the AP 10, that is, the belonging mobile units present in the wireless communication area of the AP 10. Further, the communication-volume control unit 12 has a function to control the speeds of the communication with the mobile units belonging to the AP 10. Still further, the control unit 13 has a function to control an entirety of the AP 10. Yet further, the memory 14 provides a temporary storage region that temporarily stores various data items in response to instructions from the control unit 13. The FROM 15 stores firmware (a program) of the AP 10.

Yet further, the belonging-mobile-unit counting unit 131 provided in the control unit 13 has a function to check the number of the mobile units currently belonging to the AP 10. Yet further, the packet analysis unit 132 has a function to acquire respective current communication speeds of the mobile units belonging to the AP 10. Yet further, the shaping-upper-limit calculation unit 133 has a function to automatically calculate the communication-speed upper limit to be allocated to each of the mobile units on the basis of the current number of the belonging mobile units and the respective current communication speeds of these mobile units. Note that the control unit 13 of this example embodiment may be constituted by hardware such as a CPU or an FPGA, or may be constituted by a software module.

Description of Operation in Example Embodiment

Next, an example of operations in the wireless LAN system and the AP 10 shown as the example embodiment of the present invention in FIG. 1 and FIG. 2 is described in detail with reference to the drawings.

(Description of First Operation Example)

Figure 3:
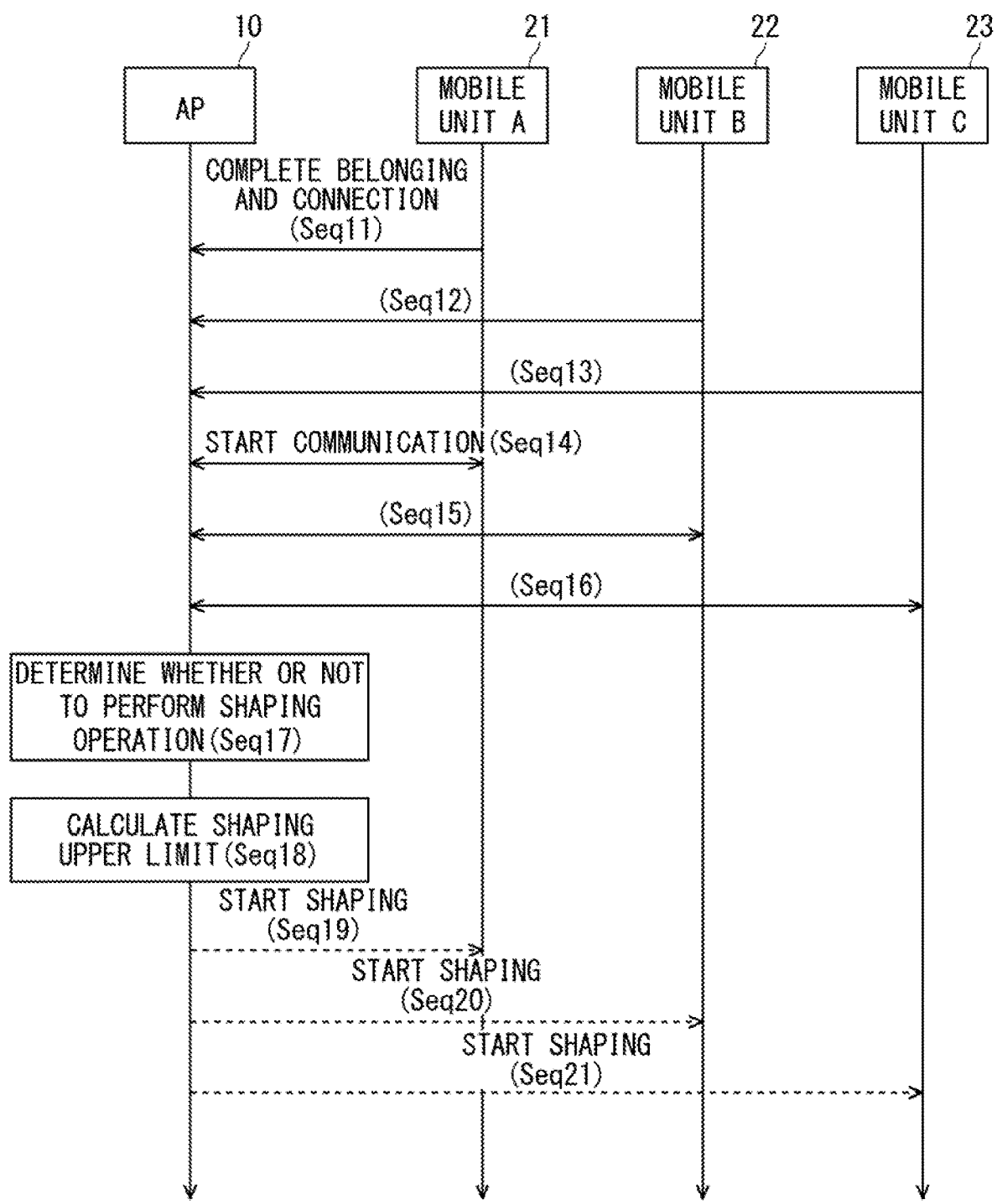
FIG. 3 is a sequential chart showing an example of a basic operation of the wireless LAN system shown in FIG. 1.

First, with reference to the flowchart of FIG. 3, a basic operation of the wireless LAN system shown in FIG. 1 is described. FIG. 3 is a sequential chart showing an example of the basic operation of the wireless LAN system shown in FIG. 1, specifically, showing basic exchange of signals between the AP 10, the mobile unit A 21, the mobile unit B 22, and the mobile unit C 23 shown in FIG. 1.

In the sequential chart of FIG. 3, first, when belonging and wireless connection between the AP 10 and the mobile unit A 21, the mobile unit B 22, and the mobile unit C 23 belonging thereto have been completed by an authentication sequence according to the IEEE 802.11 standard (Sequences Seq11, Seq12, and Seq13), the wireless communication between the AP 10 and each of the mobile unit A 21, the mobile unit B 22, and the mobile unit C 23 is started (Sequences Seq14, Seq15, and Seq16).

Immediately after the wireless communication with each of the mobile unit A 21, the mobile unit B 22, and the mobile unit C 23 has been started, the AP 10 makes therein a shaping-operation execution determination as to whether or not to perform an operation to automatically calculate the common communication-speed upper limit that should be set for each of the mobile unit A 21, the mobile unit B 22, and the mobile unit C 23 for limiting the respective communication speeds of the mobile unit A 21, the mobile unit B 22, and the mobile unit C 23 (hereinafter, referred to as a 'shaping operation') (Sequence Seq17).

Specifically, when the AP 10 has determined to perform the shaping operation, the AP 10 then performs the shaping operation so as to calculate the common communication-speed upper limit that should be set for each of the mobile unit A 21, the mobile unit B 22, and the mobile unit C 23 (Sequence Seq18). Next, the AP 10 starts the operation (the shaping operation) to limit each of the communication speeds to be equal to or lower than the common upper limit of the respective communication speeds (a shaping upper limit) by uniformly allocating the calculated communication-speed upper limit to each of the mobile unit A 21, the mobile unit B 22, and the mobile unit C 23 (Sequences Seq19, Seq20, and Seq21). Subsequently, each of the mobile unit A 21, the mobile unit B 22, and the mobile unit C 23 wirelessly communicates with the AP 10 at a communication speed up to the commonly-allocated shaping upper limit.

Figure 4:
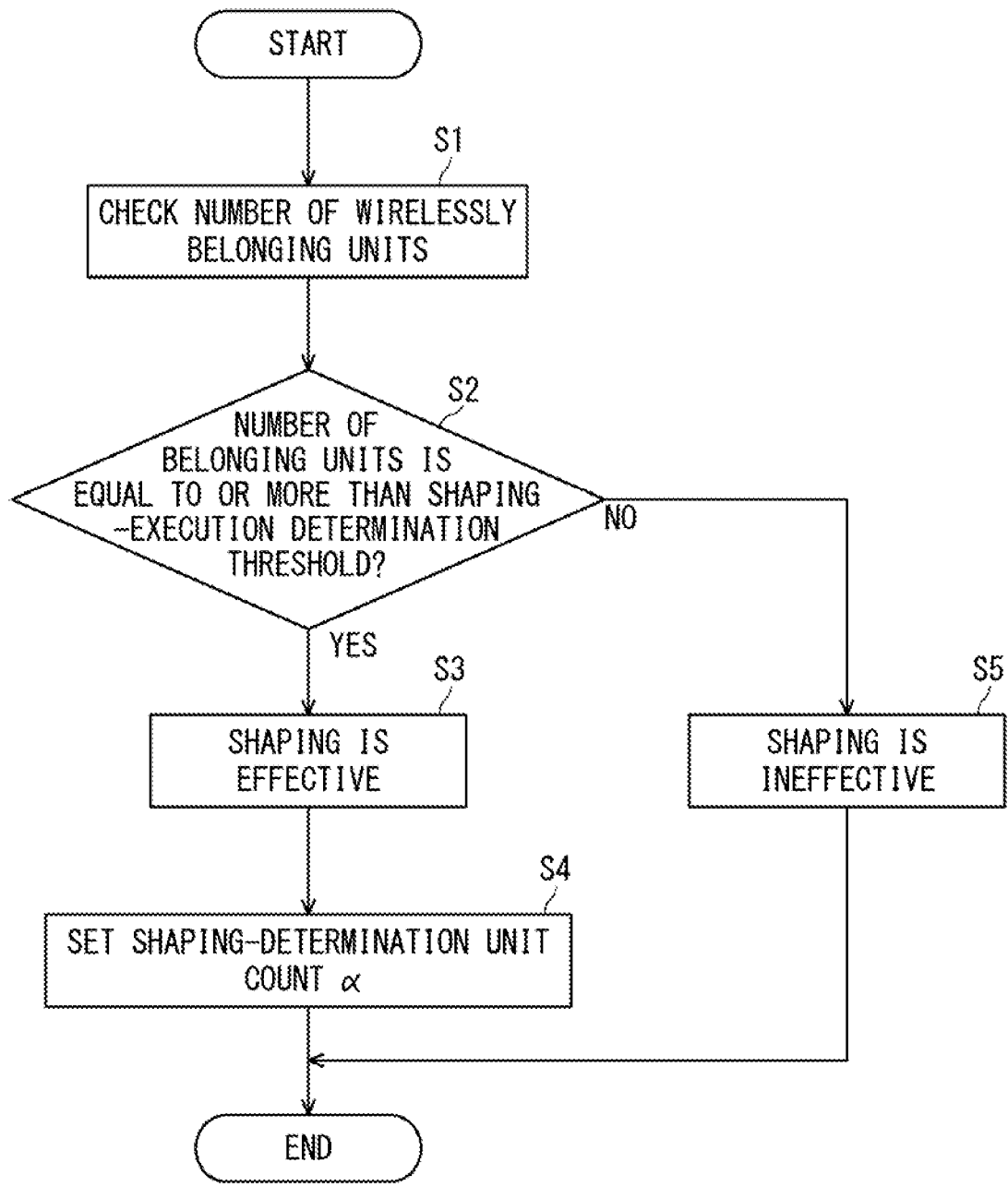
FIG. 4 is a flowchart showing an example of an operation of a shaping-operation execution determination to be made in the AP (the wireless LAN access point) in the sequential chart of FIG. 3.

Next, an example of an operation of the shaping-operation execution determination made in the AP 10 in Sequence Seq17 in the sequential chart of FIG. 3 is described in detail with reference to the flowchart of FIG. 4. FIG. 4 is a flowchart showing the example of the operation of the shaping-operation execution determination to be made in the AP 10 in the sequential chart of FIG. 3.

In the flowchart of FIG. 4, first, the AP 10, specifically, the belonging-mobile-unit counting unit 131 of the control unit 13 therein checks the number of the mobile units currently belonging to the AP 10 itself (Step S1). Then, the belonging-mobile-unit counting unit 131 checks whether or not the number of the currently-belonging mobile units is equal to or more than a threshold preset as a shaping-execution determination first threshold (Step S2).

When the number of the currently-belonging mobile units is equal to or more than the shaping-execution determination first threshold (YES in Step S2), the belonging-mobile-unit counting unit 131 determines that the shaping operation is effective, and outputs an instruction to perform the shaping operation (Step S3). In addition, in order that "three," i.e., the number of currently-belonging mobile units is used in the subsequent shaping operation as shown in Sequence Seq18 in FIG. 3, the belonging-mobile-unit counting unit 131 stores the "three" as a shaping-determination unit count $\alpha$, that is, sets "$\alpha=3$" (Step S4).

Meanwhile, when the number of the currently-belonging mobile units is less than the shaping-execution determination first threshold (NO in Step S2), the belonging-mobile-unit counting unit 131 determines that the shaping operation is ineffective, and outputs an instruction not to perform the shaping operation (Step S5).

Specifically, in this example embodiment, the shaping-execution determination first threshold is set, for example, to three. Thus, in this example embodiment, the instruction to perform the shaping operation is output. Note that the shaping-execution determination first threshold may be set to an arbitrary value by an administrator of the wireless LAN system.

The shaping-operation execution determination as shown in the flowchart of FIG. 4 is made because, when the number of the mobile units belonging to the AP 10 is small, room is left in the radio frequency band that can be allocated to all the mobile units, and hence the communication-speed upper limit need not be set. Thus, the operation to calculate the common communication-speed upper limit for each of the mobile units, such as the shaping-upper-limit calculation described in Sequence Seq18 in the sequential chart of FIG. 3, is omitted. As a result, application of unnecessary load to the AP 10 can be reduced.

Meanwhile, when the number of the mobile units belonging to the AP 10 is equal to or more than the shaping-execution determination first threshold, the room in the radio frequency band that can be allocated to each of the mobile units is not left. Thus, equity of the communication with each of the mobile units needs to be secured, and hence the shaping operation needs to be performed.

Figure 5:
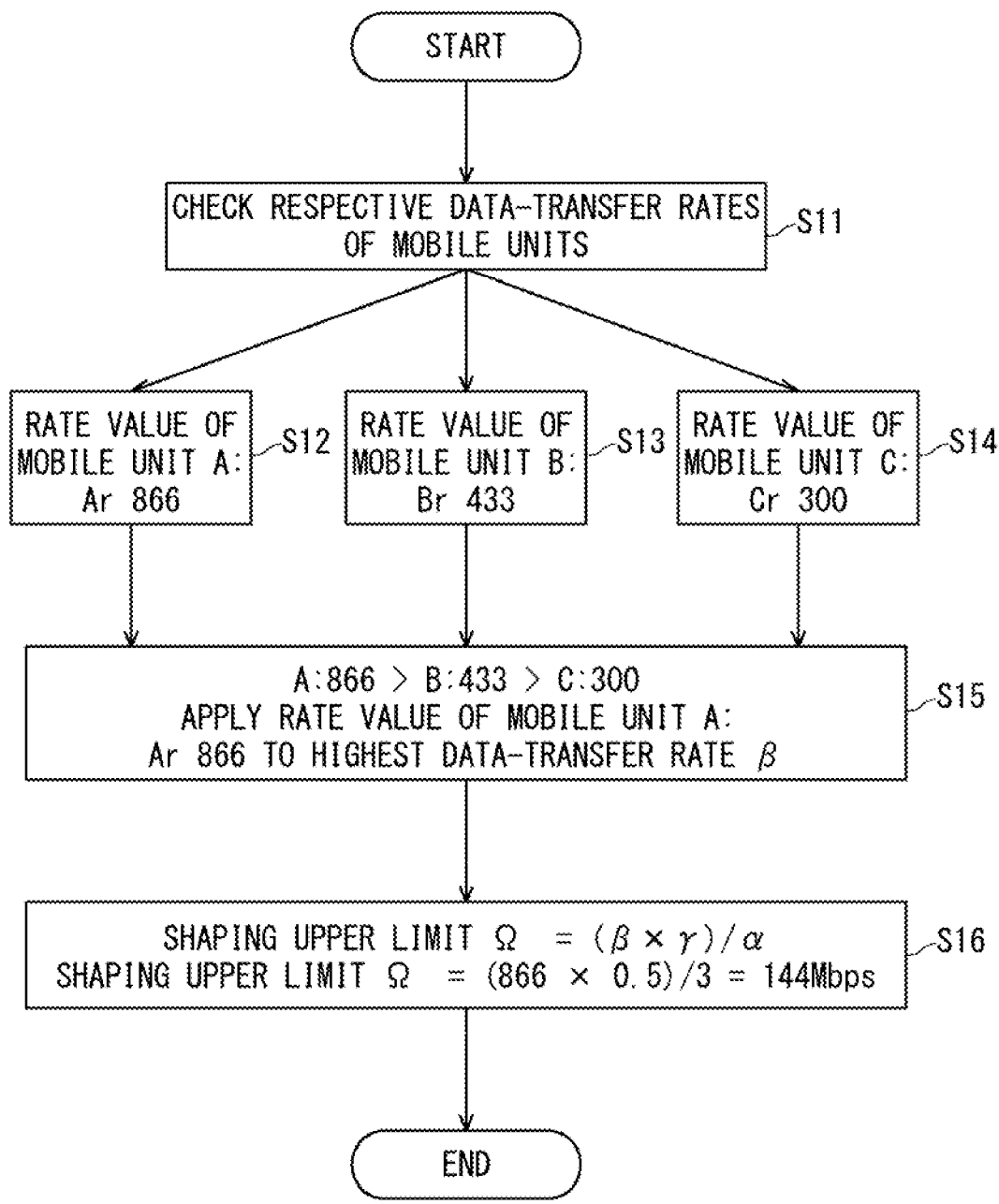
FIG. 5 is a flowchart showing an example of a shaping operation to be performed in the AP (the wireless LAN access point) in the sequential chart of FIG. 3.

Next, an operation example of the shaping operation performed in the AP 10 in Sequence Seq18 in the sequential chart of FIG. 3 is described in detail with reference to the flowchart of FIG. 5. FIG. 5 is a flowchart showing the example of the shaping operation to be performed in the AP 10 in the sequential chart of FIG. 3, specifically, showing an example of the operation to calculate the upper limit of the respective communication speeds of the belonging mobile units (shaping-upper-limit calculation operation).

By the shaping-upper-limit calculation operation shown in the flowchart of FIG. 5, with use of three parameters, specifically, the shaping-determination unit count $\alpha$ set in Step S4 in the flowchart of FIG. 4, a shaping data-transfer rate $\beta$ representing a highest one of rates of data transfer (the speeds of communication) of all the belonging mobile units to the AP 10, and a correction factor $\gamma$ set to an arbitrary value for converting the shaping data-transfer rate $\beta$ to an effective data-transfer rate (an effective communication speed), an upper limit of the wireless bandwidth to be allocated to all the mobile units, that is, the upper limit of the communication speeds is calculated.

In this context, with regard to the shaping-determination unit count $\alpha$, which represents the number of the mobile unit currently belonging to the AP 10 as described above, since the three mobile units, that is, the mobile unit A 21, the mobile unit B 22, and the mobile unit C 23 are currently belonging in this example embodiment, "$\alpha=3$" has already been set in Step S4 in the flowchart of FIG. 4. Note that specific numerical examples of the shaping data-transfer rate and the correction factor $\gamma$ will be described below.

In the flowchart of FIG. 5, first, the AP 10, specifically, the packet analysis unit 132 of the control unit 13 therein checks respective data-transfer rates per unit time of the three mobile units currently belonging to the AP 10, that is, the mobile unit A 21, the mobile unit B 22, and the mobile unit C 23 (Step S11). These data-transfer rates can be checked by causing the packet analysis unit 132 to analyze transfer rates of data frames contained in communication packets at the time when the AP 10 wirelessly communicates with each of the three mobile units, that is, the mobile unit A 21, the mobile unit B 22, and the mobile unit C 23.

In this context, the reasons that the data transfer rates are checked by analyzing the transfer rates of the data frames contained in the communication packets are described. Specifically, in the case of the wireless communication according to the IEEE 802.11 standard, not only the data communication but also various communications are constantly performed between the AP 10 and the mobile units. More specifically, the AP 10 broadcasts signals called beacons to each of the mobile units therearound normally every 100 ms, and each of the mobile units having received the beacon performs an operation to check the belonging to the AP 10 by sending a response called a probe request back to the beacon. The beacon and the probe request are exchanged at a significantly-low transfer rate called a basic rate. However, in the shaping-upper-limit calculation, such a signal transfer rate needs to be excluded, and respective transfer rates in actual data exchanges of the mobile units need to be acquired. These respective actual-data transfer rates of the mobile units are contained in header parts of the communication packets.

Thus, at the time when the AP 10 exchanges the actual data with the mobile units, the AP 10 performs an operation to acquire the data transfer rates by causing the packet analysis unit 132 to refer to the header parts of the communication packets. Note that the packet analysis unit 132 acquires, from each of the mobile units, the highest one of the data transfer rates of the data transfer rates recorded respectively in the header parts of the plurality of communication packets exchanged with the AP 10. For example, when respective highest transfer rates of 866 Mbps, 433 Mbps, and 300 Mbps are obtained as results of the analyses of the header parts of the respective communication packets from the currently-belonging three mobile units, that is, the mobile unit A 21, the mobile unit B 22, and the mobile unit C 23, a data transfer rate Ar=866 Mbps of the mobile unit A 21 is acquired (Step S12), a data transfer rate Br=433 Mbps of the mobile unit B 22 is acquired (Step S13), and a data transfer rate Cr=300 Mbps of the mobile unit C 23 (Step S14) is acquired. In other words, the order of the acquired data-transfer rates is Ar>Br>Cr.

When the AP 10 acquires the respective highest data-transfer rates of the currently-belonging three mobile units, that is, the mobile unit A 21, the mobile unit B 22, and the mobile unit C 23, the AP 10, specifically, the shaping-upper-limit calculation unit 133 of the control unit 13 therein extracts the data transfer rate Ar=866 Mbps of the mobile unit A 21, which is a highest one of the respective data-transfer rates Ar, Br, and Cr of the three mobile units, that is, the mobile unit A 21, the mobile unit B 22, and the mobile unit C 23. Then, the shaping-upper-limit calculation unit 133 regards the extracted highest one of the data transfer rates as a data transfer rate under a state in which a currently-available wireless bandwidth for the data exchange between the AP 10 and each of the mobile units has been substantially occupied, and sets the shaping data-transfer rate β to 866 Mbps.

Note that the data transfer rates Ar, Br, and Cr contained in the header parts of the respective communication packets from the currently-belonging three mobile terminals, that is, the mobile unit A 21, the mobile unit B 22, and the mobile unit C 23 are merely theoretical values of data transfer rates according to the IEEE 802.11 standard, and can be used as respective benchmarks for the communication speeds in the data exchanges with the terminals. However, even in a satisfactory radio-wave condition or a satisfactory communication environment, actual data-transfer rates (or, effective data-transfer rates) are approximately half of the theoretical values. Thus, in the shaping-upper-limit calculation, in order to calculate a communication-speed upper limit commensurate with the actual communication speeds, the theoretical values need to be multiplied by the correction factor γ for correcting the theoretical values of the data transfer rates. As described above, since the actual data-transfer rates (the effective data-transfer rates) are approximately half of the theoretical values, in this example embodiment, the correction factor γ is set to 0.5. As a matter of course, the value of the correction factor γ may be adjusted to values other than "0.5" and administered by the administrator of the wireless LAN system in accordance with actual environments or use cases.

When such correction with the correction factor γ is not performed in the shaping-upper-limit calculation, as described above, the communication speed that is much higher than the actual communication speeds is calculated and set as the upper limit. Thus, situations in which the actual communication speeds reach the preset communication-speed upper limit do not occur. As a result, it is difficult to prevent a certain one of the terminals from occupying the wireless bandwidth with respect to the AP 10, and hence it is difficult to maintain equity of the respective communication speeds of the mobile units.

Referring back to the description with reference to the flowchart of FIG. 5, the AP 10, specifically, the shaping-upper-limit calculation unit 133 of the control unit 13 therein determines the three parameters, that is, the shaping-determination unit count α, the shaping data-transfer rate β, and the correction factor γ. Then, by the following equation (1), the shaping-upper-limit calculation unit 133 calculates the communication-speed upper limit for allocating the bandwidth equitably to each of the belonging terminals, that is, a shaping upper limit S2 (Step S16).

$$\text{Shaping Upper Limit } \Omega = (\beta \times \gamma)/\alpha \quad (1)$$

Specifically, when the above-described specific numerical examples, that is,

Shaping-Determination Unit Count α=3
Shaping Data-Transfer Rate β=866 Mbps
Correction Factor γ=0.5 are substituted into the equation (1), the shaping upper limit Ω is obtained as follows.

$$\text{Shaping Upper Limit } \Omega = (866 \times 0.5)/3 = 144 \text{ Mbps}$$

After that, the AP 10 uniformly allocates the shaping upper limit Ω obtained as a result of the shaping-upper-limit calculation in FIG. 5 by the shaping-upper-limit calculation unit 133 as the common communication-speed upper limit to each of the currently-belonging mobile units, that is, the mobile unit A 21, the mobile unit B 22, and the mobile unit C 23, thereby limiting the respective communication speeds. As a specific numerical example, the communication-speed upper limit of 144 Mbps is allocated to each of the mobile unit A 21, the mobile unit B 22, and the mobile unit C 23.

In this context, in case where such an operation to limit the communication speeds by uniformly allocating the shaping upper limit Ω to each of the mobile unit A 21, the mobile unit B 22, and the mobile unit C 23 is not performed, and where the AP 10 wirelessly communicates with each of the mobile units at once, it is clear that the communication speed of the mobile unit A 21 at the highest data-transfer rate is likely to be highest, and that the communication speed of the mobile unit C 23 at the lowest data-transfer rate is likely to be low.

However, when the shaping operation is performed to limit the communication speeds by allocating the shaping upper limit Ω to each of the mobile unit A 21, the mobile unit B 22, and the mobile unit C 23 as in this example embodiment, in the mobile unit A 21, the communication-speed upper limit of the shaping upper limit Ω=144 Mbps is set with respect to the theoretical value of 866 Mbps of the data transfer rate (an effective data-transfer rate of 433 Mbps). Thus, the communication speed of the mobile unit A 21 is significantly limited. Meanwhile, in the mobile unit C 23, the communication-speed upper limit of the shaping upper limit Ω=144 Mbps is set with respect to the theoretical value of 300 Mbps of the data transfer rate (an effective data-transfer rate of 150 Mbps). Thus, the communication speed of the mobile unit C 23 is scarcely reduced. In addition, in the mobile unit B 22, the communication-speed upper limit of the shaping upper limit Ω=144 Mbps is set with respect to the theoretical value of 433 Mbps of the data transfer rate (an effective data-transfer rate of 216.5 Mbps). Thus, the communication speed of the mobile unit B 22 is reduced to some extent.

Figure 6A:
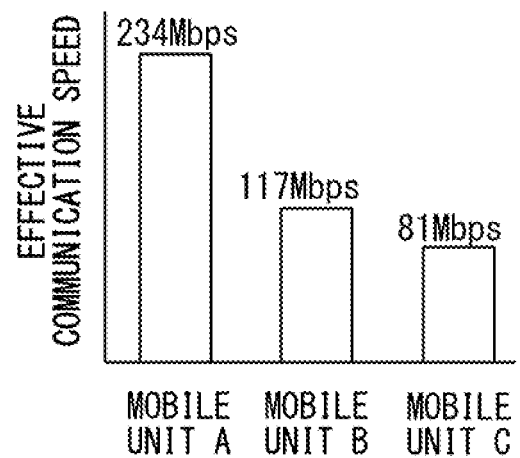
FIG. 6A is a schematic graph showing an example of advantages of the shaping operation to be performed in the AP (the wireless LAN access point) shown in FIG. 1.
Figure 6B:
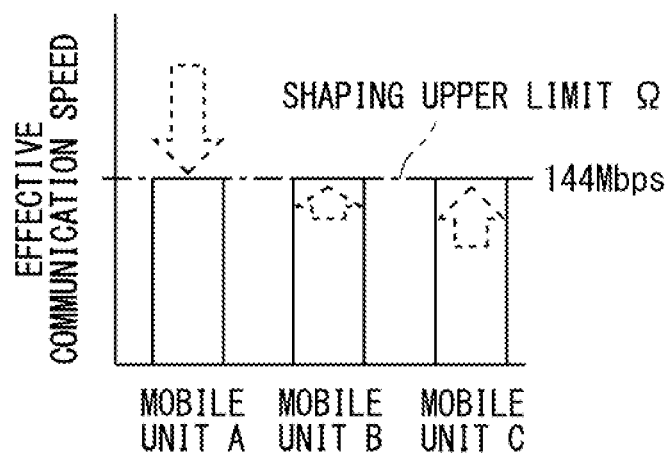
FIG. 6B is another schematic graph showing the example of the advantages of the shaping operation to be performed in the AP (the wireless LAN access point) shown in FIG. 1.

FIG. 6A and FIG. 6B are schematic graphs showing an example of advantages of the shaping operation to be performed in the AP 10 shown in FIG. 1. FIG. 6A schematically shows respective effective communication speeds of the terminals, that is, the mobile unit A 21, the mobile unit B 22, and the mobile unit C 23 in a case where the shaping operation is not performed in concurrent communication in a bandwidth of 432 Mbps. FIG. 6B schematically shows respective effective communication speeds of the terminals, that is, the mobile unit A 21, the mobile unit B 22, and the mobile unit C 23 after the shaping operation has been performed.

As shown in FIG. 6A, when the shaping operation is not performed, on an assumption that all the three mobile units share the bandwidth of 432 Mbps, for example, at a proportion similar to that in the above-described case, the effective communication speed of the mobile unit A 21 is 234 Mbps, the effective communication speed of the mobile unit B 22 is 117 Mbps, and the effective communication speed of the mobile unit C 23 is 81 Mbps. In this way, their respective effective communication speeds are unequal to each other. However, after the shaping operation has been performed, as shown in FIG. 6B, the respective effective communication speeds of the mobile units can be uniformly maintained to the shaping upper limit Ω=144 Mbps. As a result, the effective communication speed of the mobile unit A 21 is relatively reduced, and the respective communication speeds of the mobile unit B 22 and the mobile unit C 23 are relatively increased.

Hereinabove, as the basic configuration example, a specific example of the operations in the case where the three mobile units belong to the AP 10 is described. However, in the present invention, the number of the mobile terminals to belong to the AP 10 is not limited, and not only arbitrary numbers of the mobile units may be caused to belong thereto, but also shaping upper limits optimum for the numbers may be set. For example, in the case where the shaping data-transfer rate $\beta$=866 Mbps and the correction factor $\gamma$=0.5 in the above-described specific numerical examples are used, when the number of the belonging mobile units is increased by ten times as high as that in the above-described case to thirty, the shaping upper limit $\Omega$ is calculated as follows by the equation (1).

Shaping Upper Limit $\Omega$=(866×0.5)/30=14 Mbps

Thus, the communication-speed upper limit after the execution of the shaping operation is set to the shaping upper limit $\Omega$=14 Mbps, which is a value of one-tenth of the above-mentioned value in the case where the three mobile units belong.

Note that, as a matter of course, when the number of the mobile units to belong to the AP 10 increases, the number of processes by a CPU and the like in the AP 10 increase, and a total throughput of the entirety the AP 10 may decrease more than in a case where the number of the mobile units is small. In such cases, by adjusting and setting the value of the correction factor $\gamma$ to a value less than "0.5," the shaping upper limit $\Omega$ can be calculated in accordance with practical use. In addition, as a matter of course, by checking the shaping-determination unit count a indicating the number of belonging mobile units by the shaping-operation execution determination of Sequence Seq17 in the sequential chart of FIG. 3 every time the number of the mobile units to belong to the AP 10 increases and decreases, and by performing the shaping-upper-limit calculation operation by the execution of the shaping operation of Sequence Seq18, an optimum shaping-upper limit $\Omega$ can be automatically calculated in a following manner.

Note that, as a result of the series of operations of Sequence Seq17 and Sequence Seq18, as described above, when the number of the mobile units belonging to the AP 10 is so small that communication need not be equitably performed as in the case where the number of the mobile units belonging to the AP 10 is less than the shaping-execution determination first threshold, the shaping operation need not be performed. By doing so, the application of unnecessary load to the AP 10 can be prevented from increasing. In contrast, when the number of the mobile units belonging to the AP 10 has increased to the shaping-execution determination first threshold or more, and the equitable communication with each of the mobile units (equitable speeds of communication with each of the mobile units) needs to be provided, it is automatically determined in Sequence Seq17 that the shaping operation needs to be performed as a result of the shaping-operation execution determination. In Sequence Seq18, the optimum shaping upper limit $\Omega$ is set. In this way, equitable communication with each of the mobile units can be performed.

Description of Advantages of Example Embodiment

As described hereinabove in detail, according to this example embodiment, advantages as follows can be obtained.

First, the AP 10 uniformly allocates the common communication-speed upper limit (the shaping upper limit) to each of the plurality of belonging mobile units. By doing so, the equitable communication can be provided to each of the plurality of belonging mobile units.

Second, when the number of the belonging mobile units is less than the preset threshold, even without imposing the limitation to set the common communication-speed upper limit, each of the mobile units is allowed to communicate at a satisfactory communication speed. Thus, the shaping operation to allocate the common communication-speed upper limit (the shaping upper limit) to each of the mobile units is not performed. Meanwhile, when the number of the belonging mobile units is equal to or more than the threshold, in order that each of the mobile units can equitably communicate, the shaping operation to allocate the common communication-speed upper limit to each of the mobile units is performed. By doing so, the shaping operation need not be unnecessarily performed, and hence the application of unnecessary load to the AP 10 can be reduced.

Third, the determination as to whether the shaping operation to allocate the communication-speed upper limit to each of the mobile units needs to be performed can be automatically made, and the shaping operation can be automatically performed without manpower intervention. Thus, a burden on the administrator of the AP 10 can be reduced, and hence practical use is facilitated.

(Second Operation Example)

Figure 7:
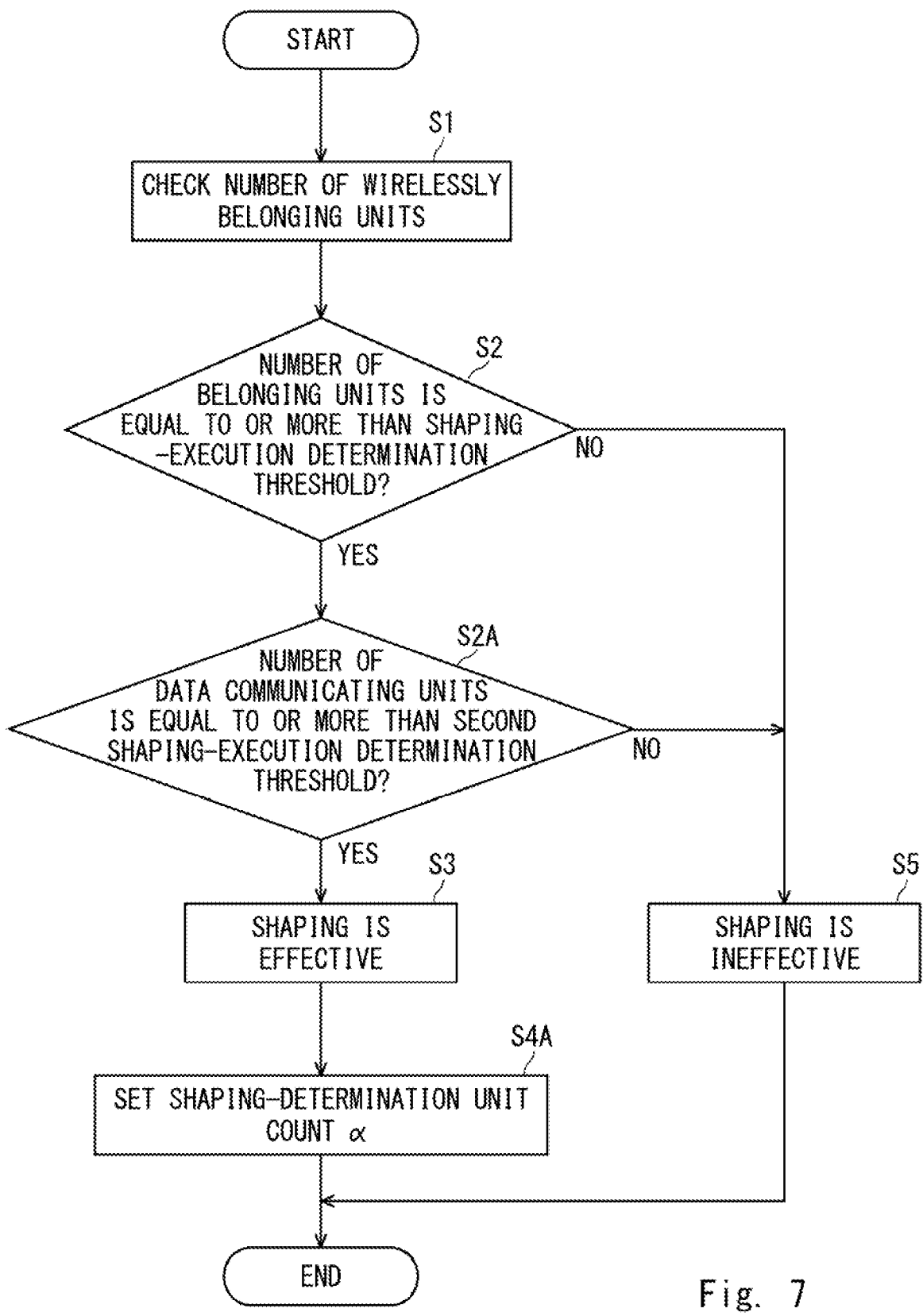
FIG. 7 is an explanatory flowchart showing another example of the operation of the shaping-operation execution determination to be made in the AP (the wireless LAN access point) in the sequential chart of FIG. 3 as a second operation example than the example of the operation shown in FIG. 4.

Next, a second operation example of the wireless LAN access point 10 shown in FIG. 2 is described with reference to the flowchart of FIG. 7. FIG. 7 is an explanatory flowchart showing another example of the operation of the shaping-operation execution determination to be made in the AP 10 in Sequence Seq17 in the sequential chart of FIG. 3 as the second operation example than the example of the operation shown in FIG. 4.

In the above-described first operation example, as shown in the flowchart of FIG. 4, the number of the mobile units belonging to the AP 10 (or, the belonging mobile units) is used for the determination as to whether or not to perform the shaping operation, and as shown in the flowchart of FIG. 5 and expressed by the equation (1), is also set as the shaping-determination unit count a so as to calculate the communication-speed upper limit (the shaping upper limit $\Omega$ in performing the shaping operation.

However, in practical use, even when the mobile units belong to the AP 10, that is, even when the mobile units are present in the wireless communication area of the AP 10, the mobile units are not necessarily communicating with the AP 10. In view of such circumstances, in the second operation example, in order to further increase accuracy in performing the shaping operation, whether or not the shaping operation needs to be performed is determined on the basis of the number of mobile units in data communication with the AP 10 (or, communicating mobile units) out of the number of the mobile units belonging to the AP 10 (or, the belonging mobile units). In addition, for the calculation of the communication-speed upper limit in performing the shaping operation (the shaping upper limit $\Omega$), the number of the mobile unit currently and actually in data communication with the AP 10 is set as the shaping-determination unit count $\alpha$.

The second operation example is described hereinafter with reference to the flowchart of FIG. 7. Note that the same ones of all Steps in FIG. 7 as those in FIG. 4 in the first operation Example are denoted by the same reference symbols.

In the flowchart of FIG. 7, first, as in the case shown in the flowchart of FIG. 4, the AP 10, specifically, the belonging-mobile-unit counting unit 131 of the control unit 13 therein checks the number of the mobile units currently belonging to the AP 10 itself (the belonging mobile units) (Step S1). Then, the belonging-mobile-unit counting unit 131 checks whether or not the number of the currently-belonging mobile units (the belonging mobile units) is equal to or more than the first threshold preset as the shaping-execution determination threshold (Step S2).

When the number of the currently-belonging mobile units (the belonging mobile units) is equal to or more than the shaping-execution determination first threshold (YES in Step S2), unlike the case shown in the flowchart of FIG. 4, the belonging-mobile-unit counting unit 131 then checks whether or not the number of the mobile units currently communicating with the AP 10 (or, the communicating mobile units) is equal to or more than another threshold preset as a second shaping-execution determination threshold (or, a second threshold) (Step S2A). When the number of the mobile units currently communicating with the AP 10 (the communicating mobile units) is equal to or more than the second shaping-execution determination threshold (the second threshold) (YES in Step S2A), the belonging-mobile-unit counting unit 131 determines that the shaping operation is effective, and outputs the instruction to perform the shaping operation (Step S3). In addition, unlike the case shown in the flowchart of FIG. 4, in order that not the number of the currently-belonging mobile units (the belonging mobile units) but the number of the mobile units currently communicating with the AP 10 (the communicating mobile units) is used in performing the shaping operation shown in FIG. 5, the belonging-mobile-unit counting unit 131 sets the number of the communicating mobile units as the shaping-determination unit count a (Step S4A).

Meanwhile, when the number of the currently-belonging mobile units (the belonging mobile units) is less than the shaping-execution determination first threshold (NO in Step S2), or when the number of the mobile units currently communicating with the AP 10 (the communicating mobile units) is less than the second shaping-execution determination threshold (the second threshold) (NO in Step S2A), the belonging-mobile-unit counting unit 131 determines that the shaping operation is ineffective, and outputs the instruction not to perform the shaping operation (Step S5).

For example, in the case of the second operation example, the number of the mobile units present in the wireless communication area of the AP 10 and belonging to the AP 10 (the belonging mobile units) is ten. Of these ten mobile units, when the number of the mobile units currently in data communication with the AP 10 (the communicating mobile units) is three, that is, the mobile unit A 21, the mobile unit B 22, and the mobile unit C 23 described in the first operation example, and when the respective highest ones of the rates at which the mobile unit A 21, the mobile unit B 22, and the mobile unit C 23 transfer data to the AP 10 are 866 Mbps, 433 Mbps, and 300 Mbps, the communication-speed upper limit, that is, the shaping upper limit S2 is set as follows as a result of the execution of the shaping operation.

Note that, also in such a case, as in the above-described first operation example, the communication-speed upper limit, that is, the shaping upper limit S2 is calculated by the equation (1) in which ten, i.e., the number of the mobile units belonging to the AP 10 (the belonging mobile units) is set as the shaping-determination unit count α. Thus, the shaping upper limit Ω is calculated as follows.

Shaping Upper Limit $\Omega=(866\times0.5)/10=43$ Mbps

In this way, even when only the three mobile units are in data communication with the AP 10, when the number of the mobile units present in the wireless communication area of the AP 10 is as large as ten, the value of the communication-speed upper limit to be set commonly to the communicating three mobile units out of the ten belonging mobile units is set smaller than that in the case of the first operation example in which the number of the belonging mobile units is three.

In contrast, in the second operation example, as described in Step S4A in FIG. 7, the communication-speed upper limit, that is, the shaping upper limit Ω is calculated by the equation (1) in which not ten, i.e., the number of the mobile units belonging to the AP 10 (the belonging mobile units), but three, i.e., the number of the mobile units currently in data communication with the AP 10 (the communicating mobile units) is set as the shaping-determination unit count α. Thus, the shaping upper limit Ω to be obtained is the same as that in the case of the first operation example as follows.

Shaping Upper Limit $\Omega=(866\times0.5)/3=144$ Mbps

In this way, in the second operation example, even when the number of the belonging mobile units currently belonging to the AP 10 and the number of the communicating mobile units currently communicating with the AP 10 are unequal to each other, the communication-speed upper limit, that is, the shaping upper limit Ω can be more properly calculated and set.

(Third Operation Example)

A third operation example of the wireless LAN access point 10 shown in FIG. 2 is described hereinafter. In the case described in each of the first and the second operation examples, in Step S11 to Step S15 in FIG. 5, the highest one of the respective data-transfer rates at which the mobile units exchange data with the AP 10 is extracted and set as the shaping data-transfer rate β, and then in Step S16, the communication-speed upper limit, that is, the shaping upper limit Ω is calculated. However, in a case described in the third operation example, conversely, a lowest one of the respective data-transfer rates at which the mobile units exchange data with the AP 10 is extracted and set as the shaping data-transfer rate β, whereby the communication-speed upper limit, that is, the shaping upper limit Ω is calculated. In this context, the shaping data-transfer rate β to be set as the lowest one of the data transfer rates as in the third operation example is referred to as a shaping data-transfer rate β' so as to be distinguished from that in the cases of the first and the second operation examples.

In other words, in the third operation example, as the equation by which the communication-speed upper limit, that is, the shaping upper limit Ω is calculated, the following equation (2) using the shaping data-transfer rate β' to be set as the lowest data-transfer rate is used instead of the above-described equation (1).

$$\text{Shaping Upper Limit } \Omega=(\beta'\times\gamma)/\alpha \qquad (2)$$

In such a way, in the case of the third operation example, after the shaping operation has been performed, a total volume of the communication between the AP 10 and the plurality of mobile units currently belonging to the AP 10 or the plurality of mobile units currently communicating with the AP 10 becomes lower than those in the cases of the first and the second operation examples. However, the communication-speed upper limit, that is, the shaping upper limit Ω can be set on the basis of the mobile unit at the lowest communication speed.

As a result, the communication bandwidth can be further easily secured for the mobile unit at the lowest communication speed, which may even allow each of the mobile units to further equitably communicate. Specifically, due to properties of the wireless communication, when a large number of mobile units are present in a small crowded space, communication conflicts occur between the mobile units. As a result, expected communication speeds may not be obtained. In the third operation example, in order that stable and equitable communication can be secured even in such cases, the mobile unit at the lowest communication speed is used as a reference. By doing so, the total volume of the communication between the AP 10 and the mobile units is reduced to set the communication-speed upper limit lower than a communication speed expected to be optimum. In this way, the stable and equitable communication can be preferentially performed.

The configurations of the preferred example embodiments according to the present invention are described hereinabove. However, it should be noted that these example embodiments are merely examples of the present invention, and hence are not intended to limit the present invention at all. Those skilled in the art could easily understand that the example embodiments may be variously modified and changed for specific purposes within the gist of the present invention.

This application is based upon and claims the benefit of priority from Japanese Patent Application No. 2017-227011, filed on Nov. 27, 2017, the disclosure of which is incorporated herein in its entirety by reference.

REFERENCE SIGNS LIST

10 AP (WIRELESS LAN ACCESS POINT)
21 MOBILE UNIT A
22 MOBILE UNIT B
23 MOBILE UNIT C
11 WIRELESS COMMUNICATION UNIT
12 COMMUNICATION-VOLUME CONTROL UNIT
13 CONTROL UNIT
14 MEMORY
15 FROM
131 BELONGING-MOBILE-UNIT COUNTING UNIT
132 PACKET ANALYSIS UNIT
133 SHAPING-UPPER-LIMIT CALCULATION UNIT

What is claimed is:

1. A wireless LAN system including a wireless LAN access point as a base unit and mobile units, wherein
the wireless LAN access point is configured to checks the number of belonging mobile units, the mobile units being those present in a wireless communication area of the wireless LAN access point and belonging to the wireless LAN access point,
the wireless LAN access point performs a shaping operation to calculate and set an upper limit of communication speeds of the belonging mobile units as a common communication-speed upper limit for each of the belonging mobile units when the number of the belonging mobile units is equal to or more than a preset first threshold, and
meanwhile the wireless LAN access point does not perform the shaping operation when the number of the belonging mobile units is less than the preset first threshold, wherein
the wireless LAN access point detects data transfer rates by analyzing header parts of communication packets to be exchanged respectively with the belonging mobile units, and to extract a highest one or a lowest one of the detected data-transfer rates as a shaping data-transfer rate, and
the shaping operation includes calculating the upper limit of the communication speeds of the belonging mobile units on the basis of a correction factor that is arbitrarily set for converting the shaping data-transfer rate to an effective data-transfer rate, on the basis of the shaping data-transfer rate, and on the basis of the number of the belonging mobile units.

2. The wireless LAN system according to claim 1, wherein
the upper limit of the communication speeds of the belonging mobile units is acquired by dividing a product of the shaping data-transfer rate and the correction factor by the number of the belonging mobile units, and
the acquired upper limit of the communication speeds of the belonging mobile units is set as the common communication-speed upper limit for each of the belonging mobile units.

3. A communication speed upper limit setting method of setting an upper limit of communication speeds of data to be exchanged between a wireless LAN access point as a base unit and mobile units in a wireless LAN system, the communication speed upper limit setting method comprising:
checking, by the wireless LAN access point, the number of belonging mobile units, the mobile units being those present in a wireless communication area of the wireless LAN access point and belonging to the wireless LAN access point; and
performing, by the wireless LAN access point, a shaping step of calculating and setting an upper limit of communication speeds of the belonging mobile units as a common communication-speed upper limit for each of the belonging mobile units when the number of the belonging mobile units is equal to or more than a preset first threshold, or the method comprising:
checking, by the wireless LAN access point, the number of the belonging mobile units, and the number of communicating mobile units as ones of the belonging mobile units, the ones of the belonging mobile units being communicating with the wireless LAN access point; and
performing, by the wireless LAN access point, the shaping step of calculating and setting an upper limit of communication speeds of the communicating mobile units as a common communication-speed upper limit for each of the communicating mobile units when the number of the belonging mobile units is equal to or more than the preset first threshold, and at the same time when the number of the communicating mobile units is equal to or more than a preset second threshold, wherein
the wireless LAN access point detects data transfer rates by analyzing header parts of communication packets to be exchanged respectively with the belonging mobile units, and extracts a highest one or a lowest one of the detected data-transfer rates as a shaping data-transfer rate, and
the shaping step includes calculating the upper limit of the communication speeds of the belonging mobile units on the basis of a correction factor that is arbitrarily set for converting the shaping data-transfer rate to an effective data-transfer rate, on the basis of the shaping data-transfer rate, and on the basis of the number of the belonging mobile units, or wherein the wireless LAN access point detects the data transfer rates by analyzing header parts of communication packets to be exchanged respectively with the communicating mobile units, and extracts the highest one or the lowest one of the detected data-transfer rates as the shaping data-transfer rate, and the shaping step includes calculating the upper limit of the communication speeds of the communicating mobile units on the basis of the correction factor that is arbitrarily set for converting the shaping data-transfer rate to the effective data-transfer rate, on the basis of the shaping data-transfer rate, and on the basis of the number of the communicating mobile units.

4. A non-transitory computer-readable medium having a communication speed upper limit setting program stored thereon, the communication speed upper limit setting program causing a computer to execute a procedure for setting an upper limit of communication speeds of data to be exchanged between a wireless LAN access point as a base unit and mobile units in a wireless LAN system, the communication speed upper limit setting program being adapted to cause the computer to perform:

causing the wireless LAN access point to check the number of belonging mobile units, the mobile units being those present in a wireless communication area of the wireless LAN access point and belonging to the wireless LAN access point; and causing the wireless LAN access point to execute a shaping process for calculating and setting an upper limit of communication speeds of the belonging mobile units as a common communication-speed upper limit for each of the belonging mobile units when the number of the belonging mobile units is equal to or more than a preset first threshold, or to perform:

causing the wireless LAN access point to check the number of the belonging mobile units, and the number of communicating mobile units as ones of the belonging mobile units, the ones of the belonging mobile units being communicating with the wireless LAN access point; and causing the wireless LAN access point to execute the shaping process for calculating and setting an upper limit of communication speeds of the communicating mobile units as a common communication-speed upper limit for each of the communicating mobile units when the number of the belonging mobile units is equal to or more than the preset first threshold, and at the same time when the number of the communicating mobile units is equal to or more than a preset second threshold, wherein:

the wireless LAN access point detects data transfer rates by analyzing header parts of communication packets to be exchanged respectively with the belonging mobile units, and extracts a highest one or a lowest one of the detected data-transfer rates as a shaping data-transfer rate, and the shaping process includes calculating the upper limit of the communication speeds of the belonging mobile units on the basis of a correction factor that is arbitrarily set for converting the shaping data-transfer rate to an effective data-transfer rate, on the basis of the shaping data-transfer rate, and on the basis of the number of the belonging mobile units, or wherein the wireless LAN access point detects the data transfer rates by analyzing header parts of communication packets to be exchanged respectively with the communicating mobile units, and extracts the highest one or the lowest one of the detected data-transfer rates as the shaping data-transfer rate, and the shaping process includes calculating the upper limit of the communication speeds of the communicating mobile units on the basis of the correction factor that is arbitrarily set for converting the shaping data-transfer rate to the effective data-transfer rate, on the basis of the shaping data-transfer rate, and on the basis of the number of the communicating mobile units.

\* \* \* \* \*